ns_ United States Patent Office 3,356,700
Patented Dec. 5, 1967

3,356,700
PRODUCTION OF COMPOUNDS OF THE
AXEROPHTHYLIDENE SERIES
Wilhelm Sarnecki, Axel Nuerrenbach, and Werner Reif, Ludwigshafen (Rhine), Germany, assignors to Badische Anilin- & Soda-Fabrik Aktiengesellschaft, Ludwigshafen (Rhine), Germany
No Drawing. Filed May 14, 1963, Ser. No. 280,437
Claims priority, application Germany, May 23, 1962, B 67,364
11 Claims. (Cl. 260—410.9)

This invention relates to a new process for the production of compounds containing the axerophthylidene radical (I):

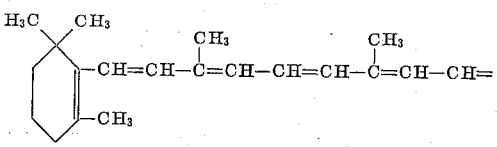

I which has entered in place of the oxo oxygen of an oxo compound, i.e. an aldehyde or ketone.

These compounds having the carbon skeleton of vitamin A may be obtained according to the process of German patent specification No. 1,068,709 by reacting vitamin A alcohol or anhydrovitamin A with a triarylphosphine and a proton donor, or with a hydro salt of a triarylphosphine on the one hand and with an oxo compound by the agency of a proton acceptor on the other hand.

It is an object of this invention to provide a new process for the production of the said compounds having the radical I which is more simple industrially and more economical than the prior art methods. A further object of the invention is to provide a process which permits the preparation of the said compounds by a simple method from waste liquors obtained industrially and containing vitamin A esters.

We have found that these and other objects are achieved by reacting an ester of vitamin A alcohol with a triaryl phosphine and a proton donor or with a hydrosalt of a triaryl phosphine and with an oxo compound and a proton acceptor (instead of using vitamin A alcohol or anhydrovitamin A esters for the reaction).

Esters may include not only esters of all-trans-vitamin A alcohol, but also those of cis-vitamin A alcohols; the term vitamin A alcohol includes all stereo isomers of this compound. The ester group may be aliphatic or aromatic; the industrially more important aliphatic esters, for example fatty acid esters such as the acetate or the palmitate, are preferred.

The reaction succeeds with all triaryl phosphines; it is preferred to use the simplest substance in this series, triphenylphosphine, for economical reasons.

Suitable proton donors are all acids which form salts with triaryl phosphines, for example organic sulfonic acids, such as p-toluenesulfonic acid and benzenesulfonic acid, and particularly sulfuric acid.

It is possible to start either from a triaryl phosphine and an acid or direct from a hydrosalt of the triarylphosphine; in all cases the hydrosalt of the triaryl phosphine is present in the reaction mixture at the commencement.

The following are given as examples of the many oxo compounds (aldehydes and ketones) which are suitable for the reaction:

acetaldehyde,
acrolein,
tiglaldehyde,
β-methylcrotonaldehyde,
α-methylhexadienal,
2,6-dimethyloctatriene-(2,4,6)-al-(1),
β-formylcrotonic acid,
esters of β-formylcrotonic acid,
γ-acetoxytiglaldehyde,
γ-alkoxytiglaldehyde,
α-methyl-β-ethoxyacrolein,
7-carboxy-2,6-dimethylheptatriene-(2,4,6)-al-(1),
8-alkoxy-2,6-dimethyloctatriene-(2,4,6)-al-(1),
7-carbalkoxy-2,6-dimethylheptatriene-(2,4,6)-al-(1),
8-acetoxy-2,6-dimethyloctatriene-(2,4,6)-al-(1),
vitamin A aldehyde,
9-[2',6',6'-trimethylcyclohexen-(2')-yl-(1')]-3,7-dimethylnonatetraen-(2,4,6,8)-al-(1) and
3,7,11,15-tetramethylhexadecahexaen-(2,4,6,8,10,14)-al-(1);

dialdehydes are also suitable. Esters of formic acid are also regarded as oxo compounds for the purpose of the present invention.

Suitable proton acceptors are acid-binding agents, for example alkali metal hydroxides, alkaline earth metal hydroxides, alkali metal amides, alkaline earth metal amides, alkali metal and alkaline earth metal enolates of ketones, ammonia, strongly basic amines, alkali metal and alkaline earth metal alcoholates and also organometallic compounds, for example methyl lithium, methyl sodium, phenyl sodium, phenyl lithium, butyl lithium, sodium acetylide, indenyl potassium and Grignard compounds such as ethyl magnesium bromide.

The reaction is advantageously carried out in solvents which may be chosen according to the oxo compound, the proton donor and the proton acceptor. Examples of suitable solvents are ethers, such as terahydrofuran, dimethyltetrahydrofuran, dioxane, hydrocarbons, such as benzene, toluene, xylene, cyclohexane, cyclooctane, isooctane, alcohols, such as methanol, ethanol, isopropanol, propanol, butanol and benzyl alcohol, and fatty acid esters, such as ethyl acetate or butyl acetate. Strongly polar solvents are preferred, such as nitrobenzene, dimethylformamide, acetonitrile and N-methylpyrrolidone. It is not necessary in all cases to avoid the presence of water.

The reaction temperatures may be varied within wide limits, for example from −50° to +100° C. and are dependent, among other things, on the boiling point of the solvent. In general it is advantageous to work at temperatures of about 0° C.

The relative amounts of the reactants is advantageously about stoichiometric, although a deficiency or excess of one or other of the components does not in general disturb the desired course of the reaction. An excess of the proton acceptor may be of advantage particularly when oxo compounds containing acid groups are being reacted or when the proton donor is also used in excess.

The yields may be improved by protecting the reaction mixture from access of atmospheric oxygen by means of a gas which is slow to react or better still by a gas which is inert, for example nitrogen or argon.

The following equation illustrates the process according to this invention with reference to the reaction of vitamin A acetate (II) with triphenylphosphine and sulfuric acid on the one hand and vitamin A aldehyde (III) and sodium methylate on the other hand, to form β-carotene (IV):

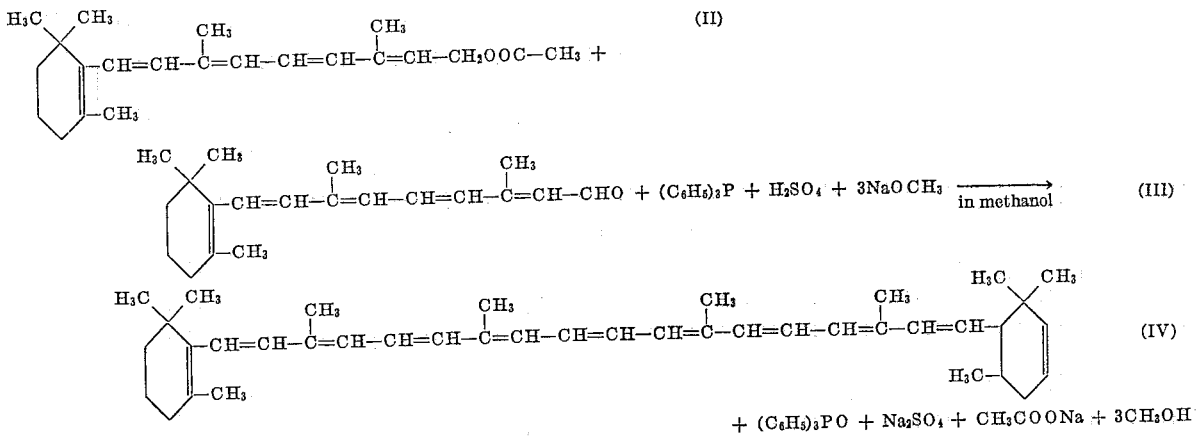

Pure vitamin A is practically unobtainable in commerce; it is sold almost exclusively as all-trans-vitamin A acetate or palmitate because these esters are more easy to obtain in crystalline form and are more stable than all-trans-vitamin A alcohol itself. Vitamin A occurring naturally in fish liver oil is also for the most part esterified.

In all methods for the recovery of vitamin A esters, waste liquors which are biologically highly active and which contain cis-vitamin A ester as well as all-trans-vitamin A esters are obtained in the final stages of crystallization. These final liquors could be utilized heretofore only for processing to all-trans-vitamin A ester. Even after part of the cis isomers present have been isomerized to the all-trans-vitamin A ester, the latter can only be recovered in part from the waste liquors and then only by prolonged and expensive methods, for example by countercurrent distribution.

The new process according to this invention provides the possibility of reacting these waste liquors direct in a simple reaction which is easy to carry out on an industrial scale to form high grade products, for example β-carotene or other carotenoids, which are usually easy to isolate from the reaction solutions.

The invention is further illustrated by the following examples in which parts are by weight unless otherwise stated. Parts by weight bear the same relation to parts by weight as the liter (S.T.P.) to the kilogram. All the steps described in the examples are carried out under an inert gas atmosphere.

Example 1

A mixture of 36 parts of triphenyl phosphonium hydrogen sulfate, 33 parts of crystalline vitamin A acetate and 200 parts by volume of methanol is stirred for twenty hours to form a clear solution. This solution is allowed to flow at the same time as 55 parts by volume of a 5.5 M methanolic sodium methylate solution at −20° C. into a solution of 24 parts of β-formylcrotonic acid ethyl ester and 50 parts by volume of methanol and the whole is stirred for another four hours.

Then 300 parts of water is added to the reaction mixture and the whole extracted with petroleum ether. The extracts are washed with water, dried over sodium sulfate and evaporated in vacuo at 50° C.

The residue contains 41 parts of a crude ester having the Formula V:

λ max=399 millimicrons; E (1%, 1 cm.)=1780. After recrystallization from alcohol: melting point 110° C.; E (1%, 1 cm., 399 millimicrons)=1880.

Example 2

A solution of 52.5 parts of vitamin A palmitate and 50 parts by volume of ethyl acetate is added at room temperature to a mixture of 26.5 parts of triphenyl phosphine and 19 parts of a 90% p-toluenesulfonic acid in 100 parts by volume of ethyl acetate. The whole is allowed to stand for twenty hours and the resultant clear solution is added at 5° to 10° C. at the same time as 180 parts of a 15% methanolic solution of potassium hydroxide into a solution of 26 parts of β-formylcrotonic acid ethyl ester in 100 parts by volume of ethyl acetate. The whole is then stirred for another hour.

500 parts by volume of petroleum ether is added to the reaction mixture and the whole kept at −20° C. for fifteen hours. The solution is filtered and worked up as described in Example 1. 49 parts of the crude ester having the Formula V (E (1%, 1 cm., 397 millimicrons)=738) is obtained as residue.

Example 3

A mixture of 18 parts of triphenyl phosphonium hydrogen sulfate, 23.5 parts of an industrial waste oil containing 32% of all-trans- and 30% of cis-vitamin A acetate and 75 parts by volume of methanol is stirred for twenty hours at room temperature until a clear solution is obtained. This solution is allowed to flow at the same time as 90 parts by volume of a 2 N methanolic sodium methylate solution at room temperature into a solution of 14 parts of vitamin A aldehyde in 100 parts by volume of methanol and the reaction mixture is stirred for another hour at +10° C. The deposited precipitate is filtered off, washed with methanol, water and again with methanol and dried. This precipitate contains 24 parts of β-carotene (IV).

By a single recrystallization from a mixture of benzene and methanol, β-carotene having a melting point of 178° to 179° C. is obtained therefrom; E (1%, 1 cm., 454 millimicrons)=2430 (in cyclohexane).

Example 4

A mixture of 1.7 parts of triphenyl phosphonium bromide, 1.65 parts of vitamin A acetate and 10 parts by volume of methanol is shaken at room temperature for three hours. A solution of 0.7 part by volume of β-formylcrotonic acid ethyl ester and 2 parts by volume of methanol is then added and 2 parts by volume of a 2.8 N methanolic sodium methylate solution allowed to flow in

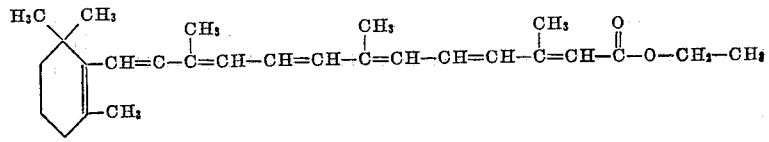

slowly at +10° to +15° C., with vigorous stirring. The whole is allowed to stand at room temperature for eighteen hours and then the deposited precipitate is filtered off, washed with a mixture (2:1) of methanol and water and dried. 0.9 part of crude ester having the Formula V is obtained; melting point 101° to 105° C.; E (1%, 1 cm., 399 millimicrons)=1455.

The filtrate is extracted with petroleum ether. By evaporation of the extract, 1.5 parts of the compound V is obtained as residue; E (1%, 1 cm., 399 millimicrons)=970.

*Example 5*

A solution of 32.8 parts of vitamin A acetate and 100 parts by volume of ethyl acetate is added at room temperature to a mixture of 26.5 parts of triphenyl phosphine and 19 parts of 19.3% aqueous hydrochloric acid in 50 parts by volume of water and 50 parts by volume of methanol. The whole is allowed to stand for fifteen hours and then the solution is adjusted to pH 6. 22 parts of β-formylcrotonic acid ethyl ester is added at 10° C. After 135 parts of 15% methanolic potassium hydroxide has been added, the whole is stirred for another half hour.

The reaction mixture is worked up as described in Example 1. 51 parts of compound V is obtained as residue; E (1%, 1 cm., 398 millimicrons)=167.

We claim:
1. A process for the production of compounds containing the axerophthylidene radical I:

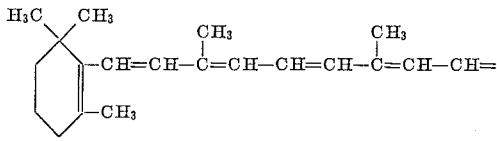

wherein the oxygen of the carbonyl group of a compound (II) selected from the group consisting of aldehydes, ketones and formic acid esters is replaced by said radical I, which process comprises: reacting (a) a fatty acid ester of vitamin A alcohol with (1) a triarylphosphine and an acid which is able to form a hydrosalt with the triarylphosphine, or (2) a hydrosalt of said triarylphosphine and said acid, and (b) thereafter reacting the reaction product thus obtained with said compound II in the presence of an acid binding agent.

2. A process as in claim 1 in which the two reaction steps (a) and (b) are carried out at temperatures of −50 to +100° C. in an organic solvent which does not itself react under the conditions of the reaction.

3. A process as in claim 1 wherein an ester of cis-vitamin A is used as a starting compound.

4. A process as in claim 1 wherein vitamin A esters in the form of mother-liquors remaining from the crystallization of the vitamin A esters are employed.

5. A process as in claim 1 in which the triarylphosphine is triphenylphosphine.

6. A process as in claim 1 wherein vitamin A acetate is used as a starting compound.

7. A process as in claim 1 in which the acid is selected from the group consisting of sulfuric acid, benzenesulfonic acid and p-toluenesulfonic acid.

8. A process as in claim 1 in which the acid binding agent is selected from the group consisting of alkali metal hydroxides, alkaline earth metal hydroxides, alkali metal amides, alkaline earth metal amides, alkali metal and alkaline earth metal enolates of ketones, ammonia, strongly basic amines, alkali metal and alkaline earth metal alcoholates, methyl lithium, methyl sodium, phenyl sodium, phenyl lithium, butyl lithium, sodium acetylide, indenyl potassium and ethyl magnesium bromide.

9. A process as in claim 1 in which compound (II) is selected from the group consisting of acetaldehyde, acrolein, tiglaldehyde, β-methylcrotonaldehyde, α-methyl-hexadienal, 2,6 - dimethyloctatriene - (2,4,6) - al - (1), β-formylcrotonic acid, esters of β-formylcrotonic acid, γ-acetoxytiglaldehyde, γ-alkoxytiglaldehyde, α - methyl - β-ethoxyacrolein, 7 - carboxy - 2,6 - dimethylheptatriene-(2,4,6)-al-(1), 8-alkoxy-2,6-dimethyloctatriene - (2,4,6)-al-(1), 7-carbalkoxy-2,6-dimethylheptatriene-(2,4,6) - al-(1), 8-acetoxy-2,6-dimethyloctatriene-(2,4,6)-al-(1), vitamin A aldehyde, 9-[2′,6′,6′ - trimethylcyclohexaen - (2′)-yl-(1′)]-3,7-dimethylnonatetraen - (2,4,6,8) - al - (1) and 3,7,11,15-tetramethylhexadecahexaen-(2,4,6,8,10,14) - al-(1); dialdehydes and esters of formic acid.

10. A process as in claim 1 wherein vitamin A palmitate is used as the starting compound.

11. A process for the production of a axerophthylidene-substituted compound which comprises reacting an alkanoic acid ester of vitamin A alcohol with (1) a salt of a triarylphosphine or (2) a triarylphosphine in the presence of an acid; reacting the obtained product with an aldehyde in the presence of an acid binding agent; and recovering the obtained axerophthylidene-substituted compound.

References Cited

UNITED STATES PATENTS 3,006,939  10/1961  Pommer et al. __ 260—410.9 XR

FOREIGN PATENTS 1,117,111  11/1961  Germany.

HENRY R. JILES, *Primary Examiner.*

JOSEPH P. BRUST, ALEX MAZEL, CHARLES B. PARKER, *Examiners.*

A. SUTTO, *Assistant Examiner.*